Patented Dec. 30, 1924.

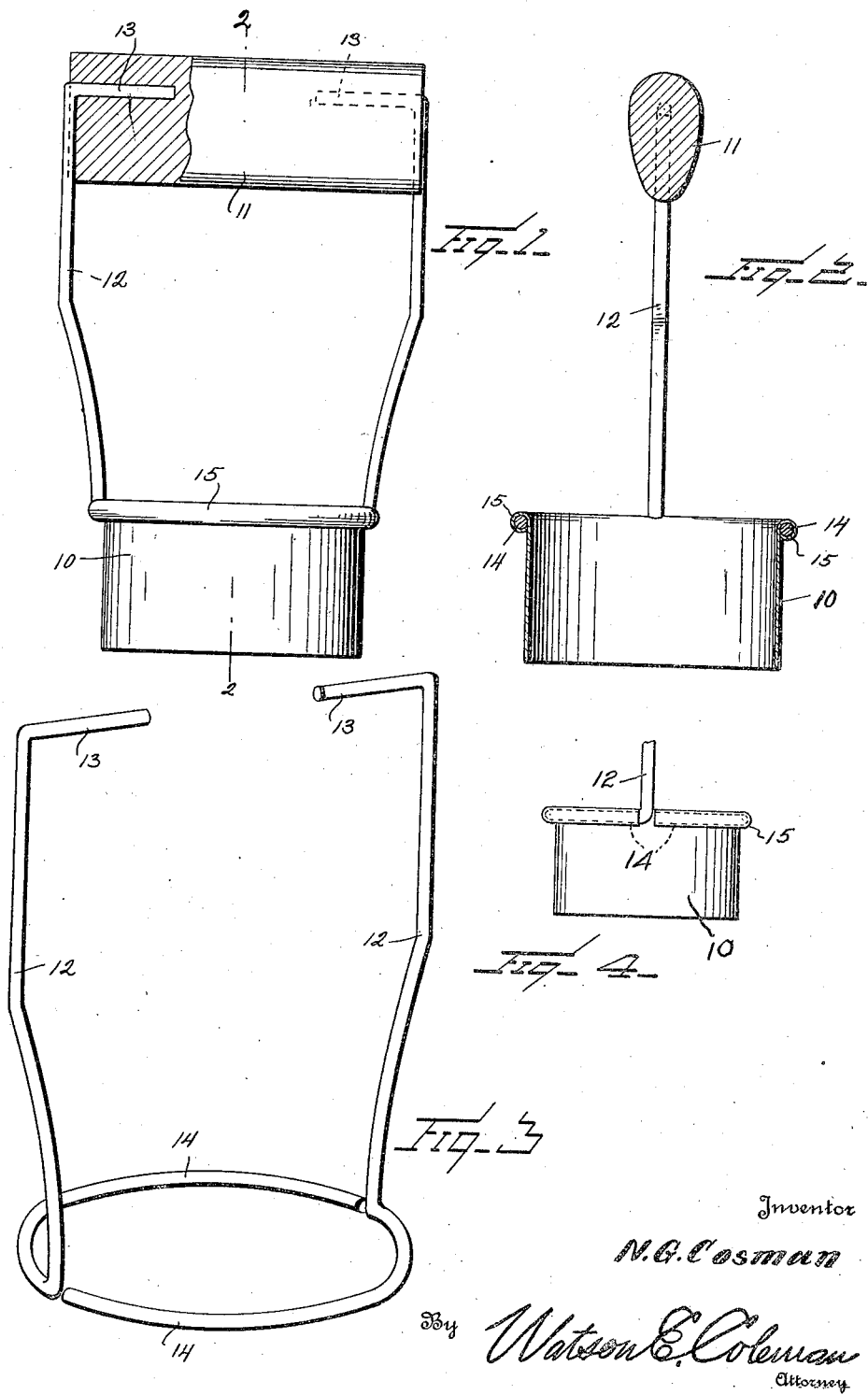

1,520,856

UNITED STATES PATENT OFFICE.

NATHAN G. COSMAN, OF NATIONAL CITY, CALIFORNIA.

CHOPPING KNIFE AND CAKE CUTTER.

Application filed June 26, 1924. Serial No. 722,569.

*To all whom it may concern:*

Be it known that I, NATHAN G. COSMAN, a citizen of the United States, residing at National City, in the county of San Diego and State of California, have invented certain new and useful Improvements in Chopping Knives and Cake Cutters, of which the following is a specification, reference being had to the accompanying drawings.

This invention relates to chopping or cutting utensils, and particularly to utensils having an annular blade and a handle disposed above the blade, utensils of this character being commonly used for cutting cakes and also for chopping purposes.

The general object of the present invention is to provide a cutter of this character which is particularly strong so that it may be used as a chopper as well as for a cake cutter and in which the handle is connected to the annular blade in such manner that the blade is perfectly braced from the handle and is supported in a rigid manner.

Another object is to provide a very cheap method of connecting the blades to the handles of implements of this character.

My invention is illustrated in the accompanying drawing, wherein:—

Figure 1 is a side elevation of a cake cutter or chopping knife constructed in accordance with my invention;

Figure 2 is a sectional view on the line 2—2 of Figure 1;

Figure 3 is a perspective view of the means for connecting the handle to the cutter;

Figure 4 is a side elevation of the chopping knife and cutter showing the manner in which the bead is interrupted at its junction with the handle shanks;

Referring to these drawings, 10 designates an annular blade of any suitable material and which, if the device is used as a cake cutter only, may be of relatively thin material. The handle 11 is disposed above the blade and diametrically with relation thereto, and the handle is supported from the blade by means of wire legs 12 which extend down from the handle 10 at each end thereof, these legs being inturned at 13 so as to extend into the handle any desired amount. The handle is grooved at its ends to receive the wire legs and prevent any turning of the handle with relation thereto. The legs 12 at their lower ends are each curved in a semi-circle, as at 14, the curved portion 14 of one leg being outwardly bowed opposite to the curved portion 14 of the other leg.

For the purpose of connecting the annular blade to the portions 14, I turn over the upper end of the annular blade at 15 so as to form a bead. It will be seen that this construction provides for a firm bearing of the legs upon the whole extent of the blade and that there is no spreading or lifting of the legs and the handle to the blade. Where the legs of the handle are soldered or riveted to the blade, there is liable to be a loose joint in a short time and the force of the blow comes upon two portions of the blade instead of being evenly distributed around the entire blade, as in my device.

This construction is very simple, strong and efficient. The device may be used either as a cake cutter or a chopper.

I claim:—

An implement of the character described comprising an annular knife blade, a handle disposed diametrically with relation to the upper end of the knife blade, and supporting legs extending downward from opposite ends of the handle to the upper end of the blade, the lower ends of said legs being curved semi-circularly in opposite directions and engaging the upper edge of the blade, the upper edge of the blade being beaded to fit said outwardly bowed portions of the legs.

In testimony whereof I hereunto affix my signature.

NATHAN G. COSMAN.